US008457295B2

(12) United States Patent
Katsikas et al.

(10) Patent No.: US 8,457,295 B2
(45) Date of Patent: Jun. 4, 2013

(54) CALL ORDERING SYSTEM USING A PRE-FILLED TRANSACTION RECORD IN A CALL CENTER TRANSACTION FROM A MOBILE PHONE

(75) Inventors: Peter L. Katsikas, Honolulu, HI (US); Karl Schweitzer, Honolulu, HI (US)

(73) Assignee: Karl Schweitzer, Honolulu, HI (US)

( * ) Notice: Subject to any disclaimer, the term of this patent is extended or adjusted under 35 U.S.C. 154(b) by 276 days.

(21) Appl. No.: 12/884,801

(22) Filed: Sep. 17, 2010

(65) Prior Publication Data

US 2012/0072934 A1    Mar. 22, 2012

(51) Int. Cl.
*H04M 3/00* (2006.01)

(52) U.S. Cl.
USPC .................. 379/265.01; 455/414.1; 705/14.1

(58) Field of Classification Search
USPC ........ 379/265.01; 455/412.2, 414.1; 705/14.1
See application file for complete search history.

(56) References Cited

U.S. PATENT DOCUMENTS

| | | | |
|---|---|---|---|
| 6,353,398 B1 | 3/2002 | Amin | |
| 6,741,188 B1 | 5/2004 | Miller | |
| 6,889,054 B2 | 5/2005 | Himmel | |
| 7,421,396 B2 | 9/2008 | Niwa | |
| 8,260,662 B2 * | 9/2012 | Kaplan | 705/14.1 |
| 2001/0042132 A1 | 11/2001 | Mayadas | |
| 2007/0073562 A1 | 3/2007 | Brice | |
| 2008/0091518 A1 | 4/2008 | Eisenson et al. | |
| 2008/0091537 A1 | 4/2008 | Miller | |
| 2008/0095354 A1 | 4/2008 | O'Connor | |
| 2008/0169937 A1 | 7/2008 | Lowry | |
| 2009/0181614 A1 * | 7/2009 | Wolff et al. | 455/3.06 |
| 2011/0161149 A1 * | 6/2011 | Kaplan | 705/14.17 |
| 2011/0292930 A1 * | 12/2011 | Mobin et al. | 370/352 |

FOREIGN PATENT DOCUMENTS

| | | |
|---|---|---|
| KR | 10-2004-0021406 A1 | 3/2004 |
| KR | 10-2004-0021406 A1 | 1/2006 |

* cited by examiner

*Primary Examiner* — Creighton Smith
(74) *Attorney, Agent, or Firm* — Leighton K. Chong

(57) ABSTRACT

A call-ordering system and method enables convenient ordering in a call center transaction from a mobile phone. User profiles with identification data and a mobile phone number are matched to advertiser offers. Text messages are sent to the mobile phone numbers for matched users with a direct inward dialed (DID) number for response. Upon receiving an incoming call to the DID number from a responding user, an Offer-Router uses the caller and DID numbers to retrieve identification data for the user and offer data for the advertiser offer. The incoming call is then routed to a call center associated with the advertiser offer and the retrieved data are pushed to the call center's terminal system for pre-filling a transaction record for the offered item. The system may also be operated in tandem with a hotel guest registration system to register traveler profiles, the hotel's purchase management system to bill call center transactions to a guest's hotel bill, and the hotel's networked TV system to give guests an option to respond to an offer by using signals sent from the TV remote control unit to complete a transaction.

20 Claims, 5 Drawing Sheets

CALL ORDERING SYSTEM USING A PRE-FILLED TRANSACTION RECORD IN A CALL CENTER TRANSACTION FROM A MOBILE PHONE

TECHNICAL FIELD

This invention generally relates to an ordering system and, more particularly, to a call ordering system for ordering an item in a call center transaction from a mobile phone.

BACKGROUND OF INVENTION

Telephone ordering by calling vendors on "800" or other toll-free numbers at call centers is commonly used for impulse purchasing of branded products and services advertised on TV or in print publications and other media. However, such advertising must generally be pre-recorded for TV or printed and distributed far in advance of the time when the item is available to be offered for purchase. Therefore, the existing call center paradigm cannot conveniently transact with purchasers for items that require up-to-the-moment information on availability and/or are offered at substantial discounts in order to take up inventory at the last hour which would otherwise go unsold. An example of the types of items that may be offered at substantial discounts days or hours before closing are visitor, recreational or sports activities in which a prescribed capacity of seats need to be sold before departure or game time.

Also, when a customer calls a call center, the call center agent typically does not know any details about the caller or what specific item the caller is interested in. The agent therefore needs to step the customer through a long series of input queries in order to fill out a complete transaction record, including the caller's name, address, affiliation, item interested in, item description, order parameters for the item, charge card information, and confirmation details. In order to avoid long waiting times for callers, vendors at call centers must operate multi-line phone banks with large agent staffing requirements to handle surges of customer call-ins during offering periods. Due to the high costs of such multi-line, multi-agent call centers, vendors often need to outsource call center operations to foreign countries.

In order to provide short-notice advertising of purchasable items offered at last minute discounts, recent ordering systems have attempted to push text or email advertising to mobile phones and communication devices and have the user respond by calling a toll-free call-center number. U.S. Pat. No. 6,889,054 to Himmel discloses a mobile push advertising system in which a user pre-registers with a base station for a mobile service area a profile of preferred items for which they want to receive mobile ads and a preferred schedule for receiving ads. When the mobile phone is detected in the base station area, ads are pushed to the mobile phone. The user has an option to establish contact with a call center pre-registered with the advertising system for fulfilling a purchase. The user's profile data may be sent to the advertiser call center to facilitate a purchase.

Another prior example described in U.S. Pat. No. 7,421,396 to Niwa is a travel information system that allows the user to register a cell phone number and a detailed pre-travel itinerary with a travel agency and receive information about local conditions purchase and offers specific to each destination area on their itinerary.

U.S. Patent Publication 2007/0073562 to Brice et al. discloses a travel information system that allows the user to pre-register a detailed itinerary with a travel agency and receive information on a wireless computer or phone specific to local events and conditions in each destination area. The traveler can also handle pre-travel bookings when preparing the itinerary with the travel agency.

U.S. Pat. Nos. 6,353,398 and 6,741,188 and Patent Publication 2008/0091537 to Miller and Amin disclose a mobile push advertising system for sending location specific information (including sale offers) to a user when their mobile phone is detected by GPS as being in a specific area.

U.S. Patent Publication 2008/0169937 to Lowry discloses a system wherein a destination vendor can be notified of the impending arrival of a user of a pre-registered cell phone at a specific location, so that the vendor can send offers to the mobile phone user just in time for their arrival.

U.S. Patent Publication 2008/0095354 to O'Connor discloses a mobile phone system in which a user can call a call service center and send ad or location information read from an RFID chip to determine to which agent at the call service center the call should be routed.

However, the prior art has not provided a solution by which a user of a mobile phone can receive an advertising message for immediate availability of an item and can conveniently complete a transaction with a call center agent in which the user's information and the item's information are already known at the time of the call. Such a solution would avoid long waiting times for callers, and allow call centers to operate more efficiently with reduced agent staffing requirements.

SUMMARY OF INVENTION

A call-ordering system and method enables convenient ordering of a transactable item in a call center transaction from a mobile phone. User profiles are stored in a database with user identification data and a mobile phone number to receive text messages for offers from advertisers. Advertiser offers are stored in a database to be matched to user profiles to receive advertiser offers. Text messages are sent to the mobile phone numbers for matched users with a direct inward dialed (DID) number for a user to respond to an advertiser offer. Upon receiving an incoming call from a responding user, the DID number and the caller number are used to retrieve identification data for the responding user and offer data for the advertiser offer. The incoming call is then routed to a call center associated with the advertiser offer and the retrieved data are pushed to the call center's terminal system for pre-filling a transaction record for convenient completion of a transaction for the offered item.

In a preferred embodiment, the call-ordering system is adapted to send advertiser offers for visitor, recreational and sports activities to travelers visiting a given locale in a given time period by storing Traveler Profiles for registering users who are expected to be travelers in a Traveler Database. Advertiser offers that are matched to traveler profiles in the Traveler Database results in generation of OfferTravelerMatch records each containing a unique DID number for an advertiser offer and the mobile phone number of the traveler whose profile matches the offer. Each OfferTravelerMatch record enables an outgoing offer message to be sent to the mobile phone number of the traveler.

Upon receiving a traveler's incoming call in response to an advertiser offer message, the DID number and the caller number are used to identify the OfferTravelerMatch record for retrieving the advertiser offer and traveler profile data, thereby enabling routing of the incoming call and retrieved data records to the associated call center.

In a further embodiment, an affiliate entity is enabled to add traveler profiles to the Traveler Database for receiving advertiser offers. The affiliate entity may be an affiliate advertiser; an affiliate website operator; an affiliate travel website; a hotel; and an airline.

In yet another embodiment, the call-ordering system may be operated operating in tandem with a hotel guest registration system for traveler guests staying at the hotel. This would eliminate having to separately register profiles for expected travelers on a call-ordering services website. The call-ordering system may also be operated in tandem with the hotel's purchase management system in order to have call center transactions billed to a guest's hotel bill. The system may also be operated in tandem with the hotel's networked TV system for displaying video advertisement offers on hotel guest in-room TVs, and giving guests an option to respond by selection signals sent from the TV remote control unit via the hotel's networked TV system for completing a network transaction.

Other objects, features, and advantages of the present invention will be explained in the following detailed description of the invention having reference to the appended drawings.

DETAILED DESCRIPTION

Figure 1:
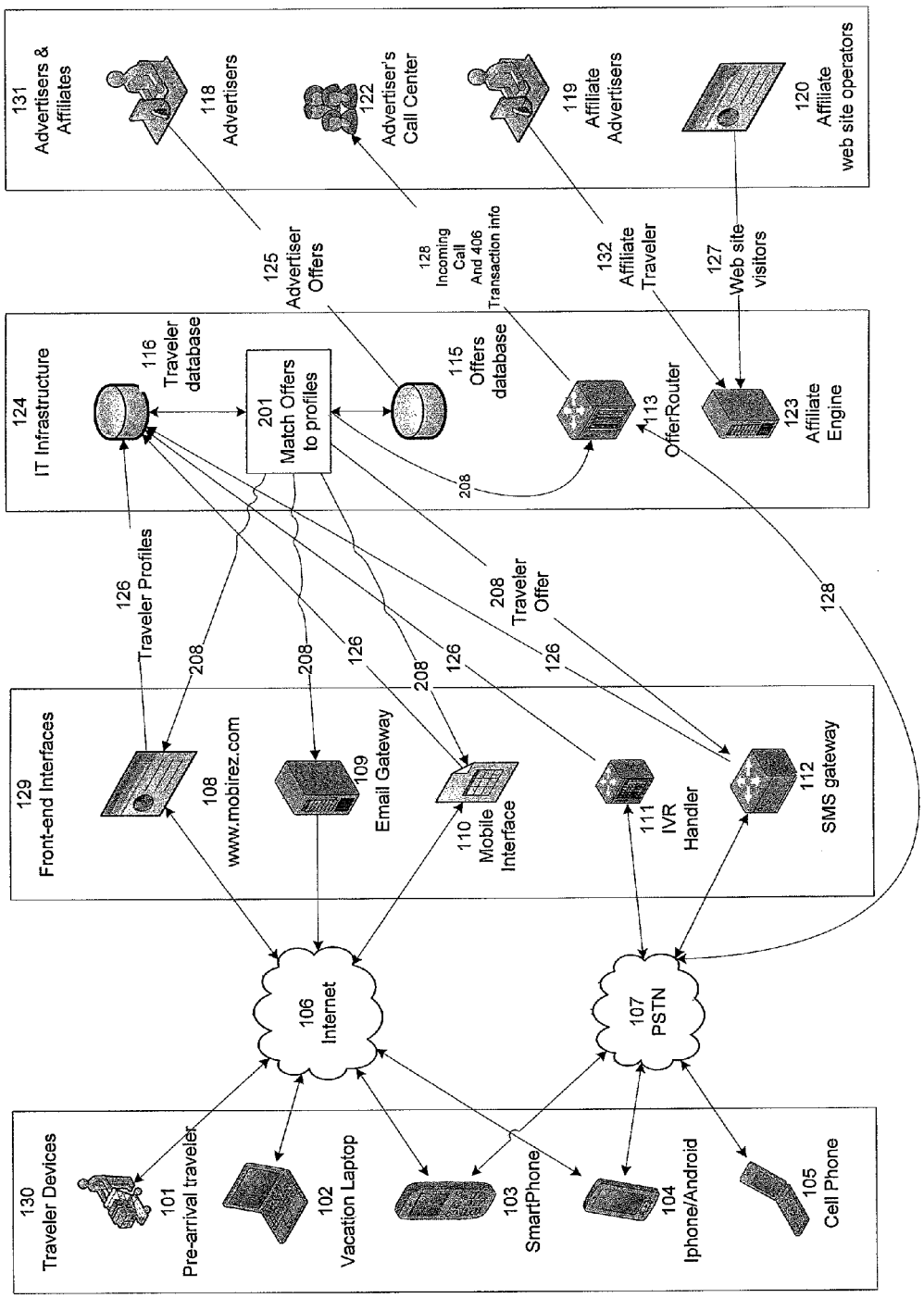
FIG. 1 is a block diagram illustrating the functional components of a call ordering system in accordance with the present invention.

In the following detailed description, certain preferred embodiments are described as illustrations of the invention in a specific application, network, or computer environment in order to provide a thorough understanding of the present invention. However, it will be recognized by one skilled in the art that the present invention may be practiced in other analogous applications or environments and with other analogous or equivalent details. Those methods, procedures, components, or functions which are commonly known to persons in the field of the invention are not described in detail as not to unnecessarily obscure a concise description of the present invention.

Some portions of the detailed description which follows are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. Aspects of the present invention are also discussed with respect to electronic devices and servers connected via Internet to a web server. A "server", "database", "online website", "system", or "system platform" can be implemented using a general purpose computer and standard peripheral devices programmed with suitable software. Although a variety of different computer systems can be used with the present invention, an exemplary computer system is shown and described in the preferred embodiment.

The exemplary embodiment described below relates to a call ordering system for up-to-the-minute offers sent to mobile phones of travelers for are visitor, recreational or sports activities days or hours before departure or game time. However, it is to be understood that the principles of invention described herein may be adapted to other embodiments for call-ordering systems and to other types of purchasable items.

Referring to FIG. 1, a traveler may use a plurality of Traveler Devices 130 to interact with Front-end Interfaces 129 for the call ordering system. A traveler may use a computer 101 at home before arrival or a laptop 102, smartphone 103, or mobile device 104 while on vacation to connect online via the Internet 106 to a Call-Ordering Services Website Interface 108 to register a traveler profile 126, connect email service to the traveler's mobile device via an Email Gateway 109, and/or register the traveler's mobile phone via the Mobile Interface 110. The traveler can then receive advertiser offers as text messages and respond by initiating a return call to a directed number displayed in the text message, using a smart phone or cell phone 105 connected through a Public Switched Telephone Network (PSTN) 107 to interfaces for an Interactive Voice Response (IVR) handler 111 and/or Short Message Service (SMS) Gateway 112.

The Front-end Interfaces 129 are connected to IT Infrastructure 124 for the call ordering system to provide and manage call ordering transaction services for a given universe of Advertisers & Affiliates (referral & distribution affiliates). The IT Infrastructure 124 includes a Traveler Database 116 for storing traveler profiles 126 including smart phone and/or cell phone numbers, an Offers Database 115 for storing Advertisers Offers 118, an OfferRouter processing module 113 for routing traveler responses via Incoming Calls 128 and related data to the advertiser's call center, and an Affiliate Engine 123 for handling traveler referrals 132 through Affiliate Advertisers 119 or website visitor referrals 127 through Affiliate Website Operators 120.

Using the described components of the call ordering system, a traveler may use the appropriate traveler device to register, complete, and/or update the Traveler Profile 126, receive or view Traveler Offers 208, and connect through the PSTN 107 to make an Incoming Call 128 to the OfferRouter 113 which connects to the corresponding Advertiser Call Center 122. Advertisers 118 create Advertiser Offers 125 which are stored in the Offers Database 115. A Match-Offers-to-Profiles processing module 201 (described in detail below) determines which Advertiser Offers match a given Traveler Profile and creates Traveler Offers 208 which are unique to a particular traveler in a given location during an offer time period. Traveler Offers 208 are accessible through various Front-End Interfaces including Web 108, Email Gateway 109, Mobile Interface 110, or SMS Gateway 112.

A fundamental feature of the present invention is that any Advertiser Offer 125 routed to a traveler device will identify two numbers (the "Magic Pair" numbers): the caller number which identifies the traveler, and the DID (Direct Inward Dial) number which is displayed in the offer for the traveler to call in order to respond to the offer. Upon the traveler responding with an Incoming Call 128 to the DID number which is received by the OfferRouter 113, the system performs the Match-Offers-to-Profiles process 201 and sends the Traveler Profile data 126 matching the caller number from Traveler Database 116 and the Advertiser Offer data 208 matching the DID number from the Offers Database 115, and the Incoming Call 128 with the combined Transaction Info 406 are routed by the OfferRouter 113 to the Advertiser's Call Center 122 where an agent takes the voice call while a transaction record is pre-filled with Transaction Info 406 and displayed on the agent's computer terminal.

Affiliates represent additional methods of adding Traveler Profiles 126 to the Traveler Database 116. Affiliate Advertisers 119 establish a connection to the Affiliate Engine 123 by which Affiliate Travelers 132 flow into the IT Infrastructure 124 and are stored in the Traveler Database 116. Affiliate Web Site Operators 120 drive Web Site Visitors 127 to the Call-Ordering Services Website 108; a subset of those visitors will register and add their Traveler Profiles 126 to the database. Affiliate Travelers or Website visitors that have registered via Affiliate Web Site Operators are specifically tagged and can participate in special computations. For example, a hotel or airline, as an Affiliate Advertiser, can register its customers with the Call-Ordering Services Website 108, so that specific offers can be sent to its customers.

Figure 2A:
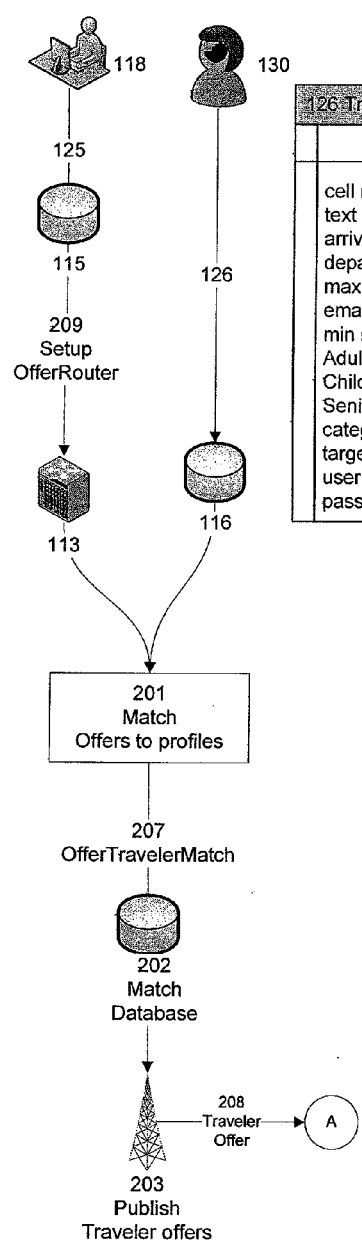
FIGS. 2A and 2B are flowcharts of the dataflow involving Advertisers and Travelers, respectively, for creating advertiser offer records and traveler profile records and completing a call order transaction.
Figure 2B:
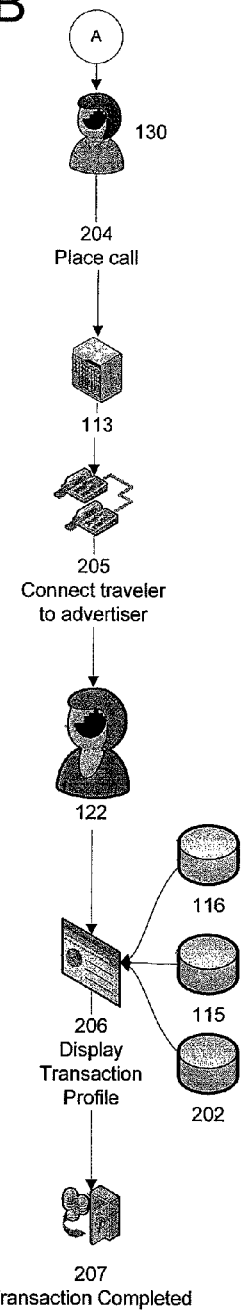

FIGS. 2A and 2B are flowcharts of the dataflow involving Advertisers and Travelers, respectively, for creating advertiser offer records and traveler profile records and completing a call order transaction. In FIG. 2A, Advertisers 118 enter an Advertiser Offer 125 (example of typical data fields shown in inset box on the upper left side of the figure) via a web interface that is stored to the Offers Database 115. This initiates a process 209 to Setup the OfferRouter to properly process incoming phone calls from responding travelers. As an example, assuming that today is August 16, Advertiser "John's Tours" can enter an Advertiser Offer to sell remaining seats on a "Sunset Dinner Cruise" sailing off Waikiki at 6 pm on Wednesday, August 18, at a 30% discount off the usual price. The Setup OfferRouter process 209 associates a toll-free DID number 800-555-1212 with John's Tours call center for incoming calls responding to this Advertiser Offer.

Travelers 130 have entered their Profiles 126 (example shown in inset box on the upper right side of the figure) with mobile phone numbers in the Traveler Database 116, including those who will be visiting in Waikiki spanning the offer time period and may have indicated an interest in dinner cruises. The Match-Offers-to-Profiles process 201 identifies which Advertiser Offers are relevant to the Traveler Profiles maintained in the database. An OfferTravelerMatch record 207, principally noting the unique OfferRouter DID number for a specific offer and the mobile phone number of a traveler whose profile matches the offer parameters, is created for each one of the matches found in the Match process 201. The record 207 can also include the AdvertiserOfferID number, the TravelerProfileID number, and a Timestamp for the offer (example shown in inset box on the lower left side of the figure). The Offer TravelerMatch records 207 are stored in Match Database 202 and, at the appropriate time for publishing the offers, outgoing Traveler Offer messages 208 are sent out to the mobile phone numbers of the traveler matches (end process at point A).

In FIG. 2B, a traveler (starting at point A) responding to the offer message places a call 204 to the DID number displayed in the offer message, and is connected to the OfferRouter 113 which uses the DID number and caller ID number to retrieve the OfferTravelerMatch record 207 identifying the specific Advertiser Offer and Traveler Profile records. With this information, the OfferRouter 113 routes the call and retrieved records at step 205 to the corresponding Advertiser Call Center 122.

At the call center, the call is routed in rollover sequencing to an available sales agent and the Advertiser Offer data (115), Traveler Profile data (116), and OfferTravelerMatch data 202 are used to pre-fill a Display Transaction Profile 206 on the terminal display for that sales agent. In this example, the Transaction Profile 206 is pre-filled with data sent by the OfferRouter for the caller's name, address, affiliation (tour group, hotel, company promotion), and payment or billing details from the traveler profile data, and the activity name, vendor name, address, offer details (including any pricing discount), and offer period from the advertiser offer data. Additional data may also be pre-filled from the vendor's stored information, such as sales scripts, customer service information and further details on the product. The pre-filled Transaction Profile record 206 would be displayed to the sales agent at the time the incoming call is routed, so that the sales agent would immediately have details identifying the traveler and the specific purchase being requested. The sales agent would proceed to complete the transaction 207 by asking the traveler caller only to confirm their request and a few input items needed to fill in the transaction record, such as number of seats desired, and how many are for children (if offered at a different pricing than adults). The pre-filling of the Transaction Profile record 206 along with routing the call from the traveler would greatly reduce the time needed to complete a transaction call, thereby making it more convenient for the traveler, and more efficient and a time and cost saving for the call center.

Figure 3:
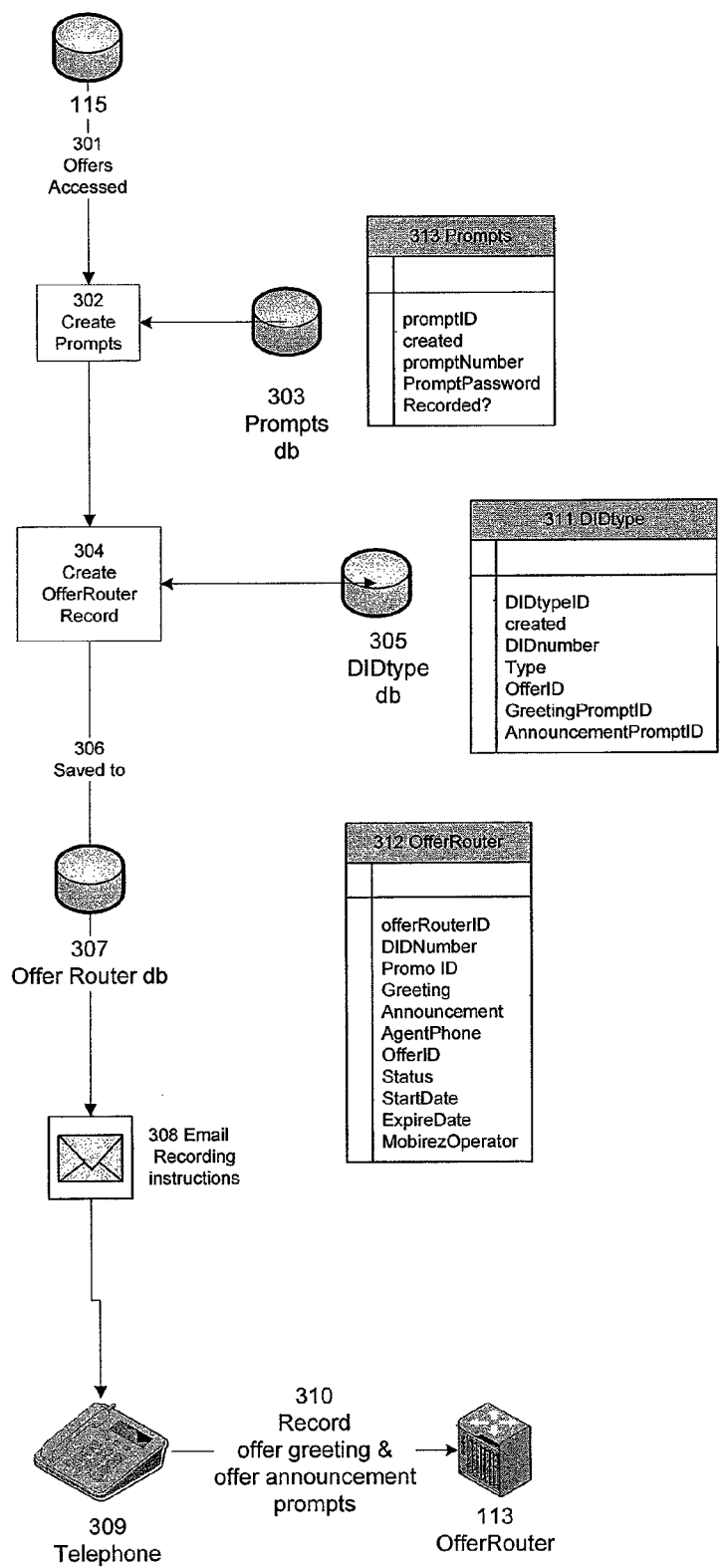
FIG. 3 is a flowchart of the setup process for routing advertiser offers to traveler mobile phones.

FIG. 3 is a flowchart of the OfferRouter Setup process (209 in FIG. 2A) for routing advertiser offers to traveler mobile phones. The process begins with the creation of an Advertiser Offer 115 which is then accessed at step 301 by the OfferRouter to create two voice prompts 302: an Offer Greeting and an Offer Announcement. These prompts use commonly known technology available to PBX systems similar to the greeting recording function for voicemail systems. The Prompts data 313 is stored in the Prompts database 303. At step 304 an available (unused) DID number (from a block of reserved numbers cycled for use) is identified by type needed for a given type of transaction from the 311 DIDtype records stored in the DIDtype database 305, and stored at step 306 in the OfferRouter database 307. An OfferRouter record 312 is created containing all the required data for a specific Advertiser Offer, including OfferRouterID number, DID number, Promo ID, Greeting, Announcement, AgentPhone number, OfferID, Status, StartDate, ExpireDate, and Website Service Operator, and is stored to the OfferRouter database 307.

Example of OfferRouter Record

| OfferRouter Field | Description/source |
| --- | --- |
| DIDNumber | The available DID from the 305 DIDtype database |
| Greeting & Announcement | The Ids that relate to the 303 stored prompts |
| AgentPhone | The advertiser's call center phone number, comes from the Advertiser's records related to the Advertiser Offer 115 |
| OfferID/Status/StartDate/ExpireDate | Information from the 115 Advertiser Offer |
| MobirezOperator | A system default phone number to call in case of an error. |

The OfferRouter process sends an email 308 containing offer activation instructions to the Advertiser including phone number, greeting and announcement prompt codes. The Advertiser places a telephone call 309 to record the offer greeting and announcement prompts at step 310 which are stored by the OfferRouter 113.

Figure 4:
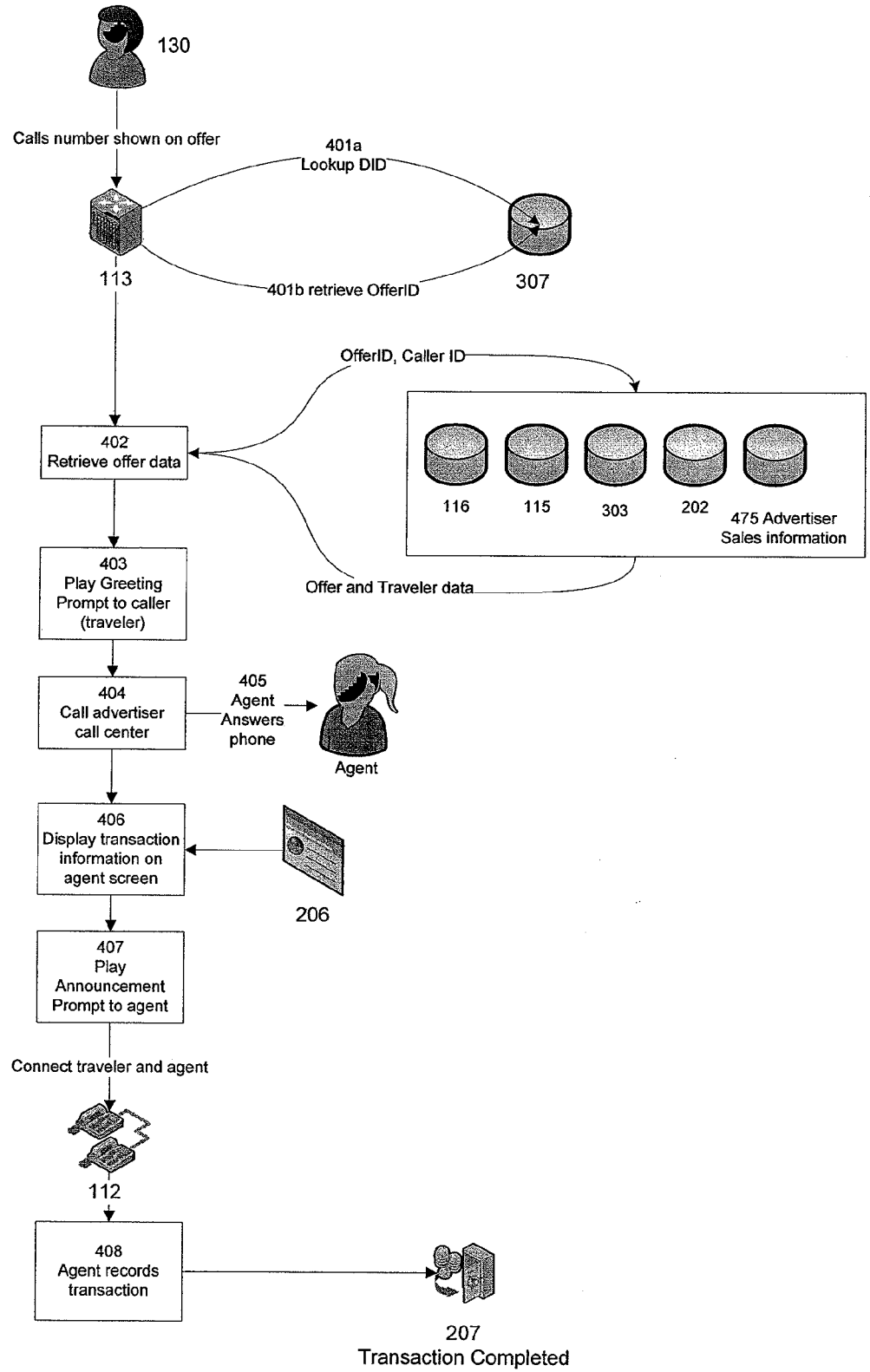
FIG. 4 is a flowchart illustrating connecting a traveler to an advertiser offer and pre-filling a call center transaction record.

FIG. 4 is a flowchart illustrating connecting a traveler to an advertiser offer and pre-filling a call center transaction record. After receiving an offer on their Traveler Device 130, a traveler calls the DID number indicated on the Traveler Offer 208. This call connects to the OfferRouter 113 which is installed in a commonly available PBX system such the Asterisk™ PBX System sold by Special Applied Intelligence Corp., Long Island City, N.Y. The OfferRouter in step 401a looks up the DID number against the OfferRouter database 307 to find a matching OfferRouter record 312 containing the OfferID returned in step 401b. In step 402, the OfferRouter uses the OfferID and the traveler's number (by caller ID) to retrieve the related Advertiser and Traveler records for the Advertiser Offer 116, Traveler Profile 115, Match 202, Prompts 303 and additional Advertiser Sales information 475 (which may include additional content such as sales scripts and detailed product information). In Step 403, the OfferRouter plays the Greeting Prompt to the traveler while the call is on hold. The OfferRouter then calls the associated Advertiser Call Center at step 404 on a second line. Once a sales agent at the call center is assigned and answers in step 405, the OfferRouter uses a commonly known "Web Push" process to send the previously retrieved Offer Data 402 to pre-fill a Transaction Profile record 206 that is displayed at step 406 on the agent's terminal display. In step 407, the Announcement Prompt is played to the agent who accepts the call. The OfferRouter then connects the traveler's call to the agent's call line at step 112 via commonly accepted PBX processes. The agent thus obtains information for both the traveler and the advertiser offer the traveler is calling about and with a few input queries can complete the transaction record at step 408 for completion of the purchase transaction at step 207 with maximum efficiency.

Examples of PBX systems that provide a "web push" function to route web-based data along with voice calls to end user portals include the Asterisk™ PBX System sold by Special Applied Intelligence Corp., Long Island City, N.Y., and the ThirdLane™ PBX System sold by Third Lane Technologies, Fairfax, Calif.

Figure 5:
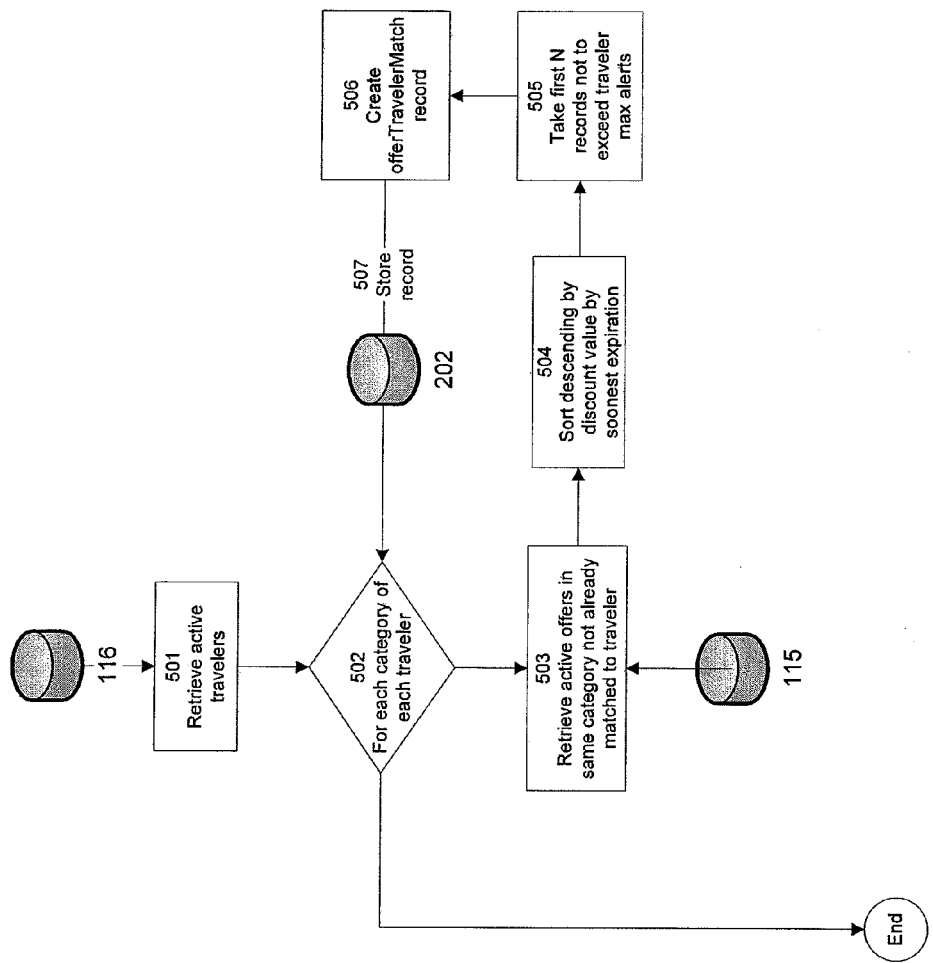
FIG. 5 is a flowchart illustrating a matching of an advertiser offer with a traveler profile in order to pre-fill a call center transaction record

FIG. 5 is a flowchart illustrating a matching of an advertiser offer with a traveler profile in order to pre-fill a call center transaction record. The Match-Offers-to-Profiles process 201 begins with step 501 which retrieves records for all active travelers in the given locale spanning a given offer period from the Traveler Database 116. Step 502 loops through each offer category of interest for each traveler to perform the following actions. Step 503 retrieves all active Advertiser Offers from the Advertiser Offers database 115 that have not been previously matched to this traveler. Step 504 sorts this list of Advertiser Offers in descending order by the discount value of the offer for the soonest expiration date of the Advertiser Offer. Step 505 then takes the first N records where N is the number of maximum alerts the traveler has indicated they want to receive in their Traveler Profile. Step 506 then creates an OfferTravelerMatch record (207 in FIG. 2A) and then at step 507 stores that record into the Match database 202. After all the offer categories for all the active travelers have been looped through, the process terminates.

As a further enhancement, the call ordering system can be operated in tandem with a hotel guest registration and purchase management system (PMS). Hotels receive all necessary identity information for traveler guests staying in a locale over a defined period, and also obtain billing and payment information for a hotel stay. The guest and billing information can be used for registering travelers in a call-ordering system operated in conjunction with the hotel operator. As part of the hotel registration process, a traveler guest can be asked to provide a few further preferences and opt-in selections for the call-ordering system, such as whether they would like to receive discount offers on their mobile phones, what types, any limit, and whether they would like to have purchase transactions billed to their hotel bill. This would eliminate the need to have the traveler register in a separate process with the call-ordering services website. In addition, the same IT infrastructure for generating advertiser offers to the guest's mobile phone can be used to send video offers to be displayed on the guest's in-room TV. The TV services platform for the in-room TV can be coupled to the hotel PMS system to enable a hotel guest the option to respond to an offer by inputting selection choices via signals from the TV remote control unit to the set-top box to be routed to an advertiser's transaction website. An in-room TV ordering system of this type is described in commonly owned U.S. patent application Ser. No. 11/530, 379 filed Sep. 8, 2006, now issued as U.S. Pat. No. 7,788,136 on Aug. 31, 2010, which is incorporated herein by reference. Combining such a system with the calling-ordering system would utilize a single guest registration process and give a guest options for responding to an offer via the in-room TV (which may be preferred by foreign language visitors) or by a voice call to a call center on their mobile phone.

It is to be understood that many modifications and variations may be devised given the above description of the principles of the invention. It is intended that all such modifications and variations be considered as within the spirit and scope of this invention, as defined in the following claims.

The invention claimed is:

1. A call-ordering system for ordering an item in a call center transaction from a mobile phone, comprising:
   (a) a first database operable with a call-ordering server for storing user profiles for each registered user of the call-ordering system including their identification data and a mobile phone number they designate to receive text messages for offers from advertisers of interest;
   (b) a second database operable with the call-ordering server for storing records for each advertiser offer to be handled by the call-ordering system including offer data that are to be matched to profiles of users that have designated to receive text messages for advertiser offers;

(c) a Match-Offers-to-Profiles processing module operable with the call-ordering server for matching user profiles from the first database to advertiser offers from the second database and generating offer-match records for sending text messages to the mobile phone numbers for matched users that include a direct inward dialed (DID) number for a user to respond to an advertiser offer; and (d) an OfferRouter processing module operable with the call-ordering server for receiving an incoming call from the mobile phone of a responding user to the DID number, and using a caller number for the incoming call and DID number to retrieve identification data for the responding user and offer data for the advertiser offer, wherein said OfferRouter processing module is configured to send the user identification data retrieved using the caller number for the incoming call and the offer data for the advertiser offer using the DID number to a designated call center for fulfilling ordering of the item to which the caller responded, whereby the OfferRouter processing module is enabled to rout the incoming call to the call center associated with the advertiser offer and push the retrieved data to the call center's terminal system for pre-filling a transaction record with user identification data and advertiser offer data for convenient completion of the transaction.

2. A call-ordering system for ordering an item in a call center transaction from a mobile phone, comprising:

(a) a first database operable with a call-ordering server for storing user profiles for each registered user of the call-ordering system including their identification data and a mobile phone number they designate to receive text messages for offers from advertisers of interest;

(b) a second database operable with the call-ordering server for storing records for each advertiser offer to be handled by the call-ordering system including offer data that are to be matched to profiles of users that have designated to receive text messages for advertiser offers;

(c) a Match-Offers-to-Profiles processing module operable with the call-ordering server for matching user profiles from the first database to advertiser offers from the second database and generating offer-match records for sending text messages to the mobile phone for matched users that include a direct inward dialed (DID) number for a user to respond to the offer; and (d) an OfferRouter processing module operable with the call-ordering server for receiving an incoming call from the mobile phone of a responding user to the DID number, and using a caller number for the incoming call and DID number to retrieve identification data for the responding user and offer data for the advertiser offer, whereby the OfferRouter processing module is enabled to rout the incoming call to the call center associated with the advertiser offer and push the retrieved data to the call center's terminal system for pre-filling a transaction record with user identification data and advertiser offer data for convenient completion of the transaction, which is adapted to send advertiser offers for visitor, recreational and sports activities to travelers visiting a given locale in a given time period, and wherein said first database is a Traveler Database of Traveler Profiles for registering users who are expected to be travelers.

3. A call-ordering system according to claim 2, wherein the Match-Offers-to-Profiles processing module matches advertiser offers to traveler profiles in the Traveler Database and generates OfferTravelerMatch records each containing a unique OfferRouter DID number for an advertiser offer and the mobile phone number of the traveler whose profile matches the offer, and each OfferTravelerMatch record enables an outgoing offer message to be sent to the mobile phone number of the traveler.

4. A call-ordering system according to claim 3, wherein the OfferRouter processing module receives a traveler's incoming call and uses the DID number and caller number to retrieve the OfferTravelerMatch record identifying the advertiser offer and traveler profile data records, thereby enabling the OfferRouter processing module to route the incoming call and retrieved data records to the call center.

5. A call-ordering system according to claim 2, wherein an affiliate entity is enabled to add traveler profiles maintained by the affiliate entity to the Traveler Database for receiving advertiser offers, and the affiliate entity is one of the group consisting of: an affiliate advertiser; an affiliate website operator; an affiliate travel website; a hotel; and an airline.

6. A call-ordering system according to claim 2, wherein the OfferRouter processing module employs a web push process to send the retrieved data records to the call center terminal system for pre-filling the transaction profile record for completing a transaction.

7. A call-ordering system according to claim 2, wherein the Match-Offers-to-Profiles processing module retrieves records for all active travelers in a given locale spanning a given offer period from the Traveler Database, then loops through each offer category of interest for each traveler to create an OfferTravelerMatch record for an offer to be sent to a traveler.

8. A call-ordering system according to claim 2, wherein the call ordering system is adapted to be operated in tandem with a hotel guest registration system which registers and obtains identity information for traveler guests staying at the hotel.

9. A call-ordering system according to claim 8, wherein the call ordering system is adapted to be operated in tandem with a hotel's purchase management system in order to have call center transactions billed to a guest's hotel bill.

10. A call-ordering system according to claim 9, wherein the call ordering system is adapted to be operated in tandem with a hotel's networked TV system for guest in-room TVs, wherein the Match-Offers-to-Profiles processing module is enabled to send a video advertisement for an advertiser offer to be displayed on a guest's in-room TV, and the guest has an option to respond by sending selection signals from a TV remote control unit via the hotel's networked TV system for completing a network transaction.

11. A call-ordering method for ordering a transactable item in a call center transaction from a mobile phone, comprising:

(a) storing user profiles in a first database for each registered user for call-ordering including their identification data and a mobile phone number they designate to receive text messages for offers from advertisers of interest;

(b) storing records in a second database for each advertiser offer including offer data that are to be matched to profiles of users that have designated to receive text messages for advertiser offers;

(c) processing user profiles from the first database for matches to an advertiser offer from the second database and generating offer-match records for sending text messages to the mobile phone for matched users that include a direct inward dialed (DID) number for a user to respond to the advertiser offer;

(d) receiving an incoming call from the mobile phone of a responding user to the DID number for the advertiser offer, and based on a caller ID number for the incoming call retrieving identification data from the first database for the responding user, and based on the DID number to which the incoming call is directed retrieving offer data for the advertiser offer, and (e) sending the caller identification data retrieved using the caller number for the incoming call and the offer data for the advertiser offer using the DID number to the call center associated with the advertiser offer and pushing the retrieved offer data to the call center's terminal system for pre-filling a transaction record with user identification data and advertiser offer data for convenient completion of a transaction.

12. A call-ordering method for ordering a transactable item in a call center transaction from a mobile phone, comprising:

(a) storing user profiles in a first database for each registered user for call-ordering including their identification data and a mobile phone number they designate to receive text messages for offers from advertisers of interest;

(b) storing records in a second database for each advertiser offer including offer data that are to be matched to profiles of users that have designated to receive text messages for advertiser offers;

(c) processing user profiles from the first database for matches to the advertiser offer from the second database and generating offer-match records for sending text messages to the mobile phone numbers for matched users that include a direct inward dialed (DID) number for a user to respond to the advertiser offer;

(d) receiving an incoming call from the mobile phone of a responding user to the DID number for the advertiser offer, and based on a caller ID number for the incoming call retrieving the identification data from the first database for the responding user, and based on the DID number to which the incoming call is directed retrieving offer data for the advertiser offer, and (e) routing the incoming call to the call center associated with the advertiser offer and pushing the retrieved data to the call center's terminal system for pre-filling a transaction record with user identification data and the advertiser offer for convenient completion of a transaction, which is adapted to send advertiser offers for visitor, recreational and sports activities to travelers visiting a given locale in a given time period, and wherein said first database is a Traveler Database of Traveler Profiles for registering users who are expected to be travelers.

13. A call-ordering method according to claim 12, wherein in the processing step advertiser offers are matched to traveler profiles in the Traveler Database and results in generation of OfferTravelerMatch records each containing a unique DID number for an advertiser offer and the mobile phone number of the traveler whose profile matches the offer, and each OfferTravelerMatch record enables an outgoing offer message to be sent to the mobile phone number of the traveler.

14. A call-ordering method according to claim 13, wherein in the processing step a traveler's incoming call is received and the DID number and caller number are used to identify the OfferTravelerMatch record and retrieve the advertiser offer and traveler profile data, thereby enabling routing of the incoming call and retrieved data to the call center.

15. A call-ordering method according to claim 12, wherein an affiliate entity is enabled to add traveler profiles maintained by the affiliate entity to the Traveler Database for receiving advertiser offers, and the affiliate entity is one of the group consisting of: an affiliate advertiser; an affiliate website operator; an affiliate travel website; a hotel; and an airline.

16. A call-ordering method according to claim 12, wherein the processing step employs a web push process to send the retrieved data to the call center's terminal system for pre-filling a transaction profile record for completing a transaction.

17. A call-ordering method according to claim 12, wherein the processing step retrieves records for all active travelers in a given locale spanning a given offer period from the Traveler Database, then loops through each offer category of interest for each traveler to create an OfferTravelerMatch record for each offer to be sent to a traveler.

18. A call-ordering method according to claim 12, further comprising operating in tandem with a hotel guest registration system which registers and obtains identity information for traveler guests staying at the hotel.

19. A call-ordering method according to claim 18, wherein the operating step includes operating in tandem with the hotel's purchase management system in order to have call center transactions billed to a guest's hotel bill.

20. A call-ordering method according to claim 19, wherein the operating step includes operating in tandem with the hotel's networked TV system for guest in-room TVs, wherein the processing step enables sending a video advertisement for an advertiser offer to be displayed on a guest's in-room TV, and the guest has an option to respond by sending selection signals from a TV remote control unit via the hotel's networked TV system for completing a network transaction.

* * * * *